United States Patent
Evans et al.

(10) Patent No.: US 9,383,512 B2
(45) Date of Patent: Jul. 5, 2016

(54) LIGHT ABSORPTION AND SCATTERING DEVICES IN A PHOTONIC INTEGRATED CIRCUIT THAT MINIMIZE OPTICAL FEEDBACK AND NOISE

(71) Applicant: Infinera Corporation, Sunnyvale, CA (US)

(72) Inventors: Peter Weindel Evans, Mountain House, CA (US); Pavel Viktorovich Studenkov, Cupertino, CA (US); Mehrdad Ziari, Pleasanton, CA (US); Matthias Kuntz, Berkeley, CA (US)

(73) Assignee: Infinera Corporation, Sunnyvale, CA (US)

( * ) Notice: Subject to any disclaimer, the term of this patent is extended or adjusted under 35 U.S.C. 154(b) by 291 days.

(21) Appl. No.: 13/732,163

(22) Filed: Dec. 31, 2012

(65) Prior Publication Data

US 2014/0185979 A1    Jul. 3, 2014

(51) Int. Cl.
  *G02B 6/12*    (2006.01)
  *G02B 6/26*    (2006.01)
  *G02B 6/28*    (2006.01)

(52) U.S. Cl.
  CPC ........ *G02B 6/12004* (2013.01); *G02B 6/12014* (2013.01); *G02B 6/2813* (2013.01)

(58) Field of Classification Search
  CPC ............. G02B 6/12004; G02B 6/2813; G02B 6/12014; G02B 6/12; G02B 6/26
  USPC .......................................... 385/12, 14–16, 24
  See application file for complete search history.

(56) References Cited

U.S. PATENT DOCUMENTS

| | | | | |
|---|---|---|---|---|
| 3,715,461 | A * | 2/1973 | Hanlon | 386/313 |
| 4,939,682 | A * | 7/1990 | Falk | 708/191 |
| 6,028,663 | A * | 2/2000 | O'Mongain et al. | 356/213 |
| 2004/0086249 | A1* | 5/2004 | Zoorob | 385/129 |
| 2005/0249509 | A1* | 11/2005 | Nagarajan et al. | 398/198 |
| 2008/0138088 | A1* | 6/2008 | Welch et al. | 398/183 |
| 2010/0247030 | A1* | 9/2010 | Furuyama | 385/14 |
| 2010/0303476 | A1* | 12/2010 | Barton et al. | 398/212 |
| 2011/0255303 | A1* | 10/2011 | Nichol et al. | 362/606 |

OTHER PUBLICATIONS

R. Hanfoug et al., "Reduced reflections from multimode interference couplers", Electronics Letters Apr. 13, 2006 vol. 42 No. 8, Apr. 13, 2006, pp. 465-466.
R. Hanfoug et al. "A Multimode Interference coupler with low reflections," Proceedings Symposium IEEE/LEOS Benelux Chapter, 2005, Mons, pp. 97-100.

* cited by examiner

*Primary Examiner* — Akm Enayet Ullah
(74) *Attorney, Agent, or Firm* — David L. Soltz

(57) ABSTRACT

A photonic integrated circuit is provided that may include a substrate; one or more optical sources, on the substrate, to output light associated with a corresponding one or more optical signals; one or more waveguides connected to the one or more optical sources; a multiplexer connected to the one or more waveguides; and one or more light absorptive structures, located on the substrate adjacent to one of the one or more optical sources, one of the one or more waveguides, and/or the multiplexer, to absorb a portion of the light associated with at least one of the corresponding one or more optical signals.

12 Claims, 20 Drawing Sheets

TX 12-1

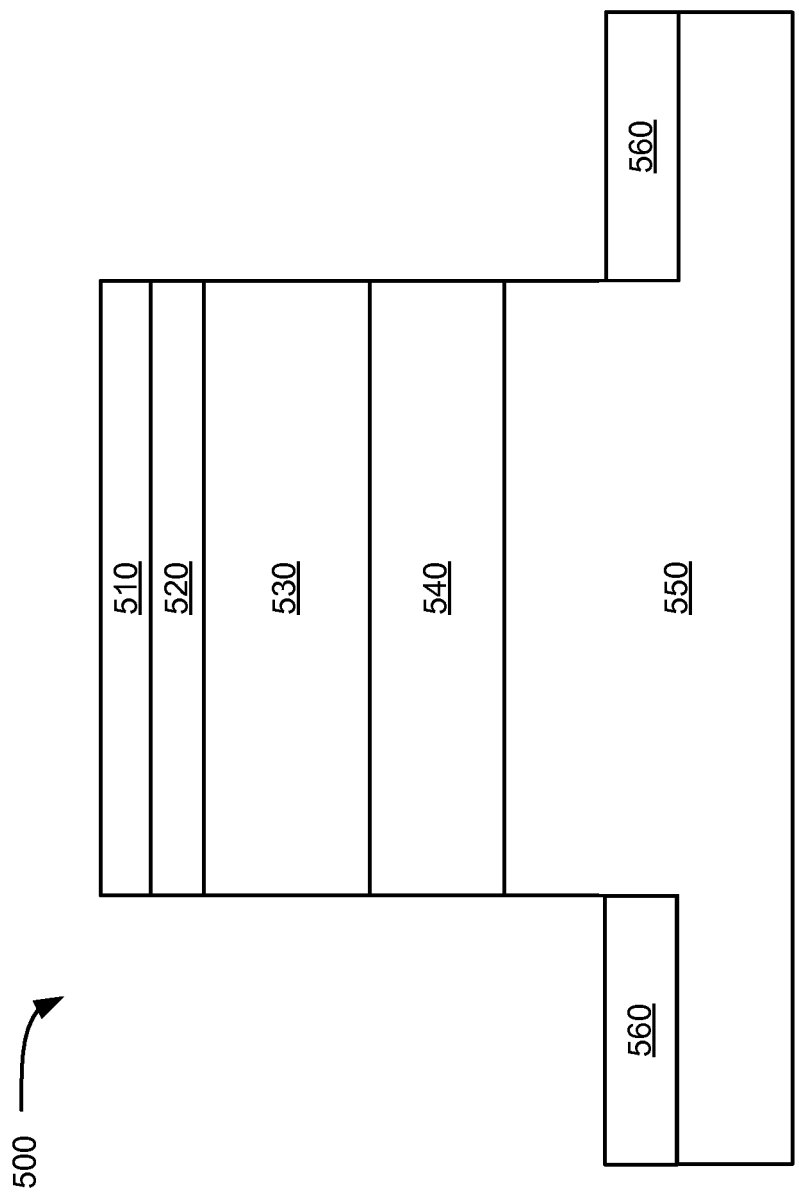

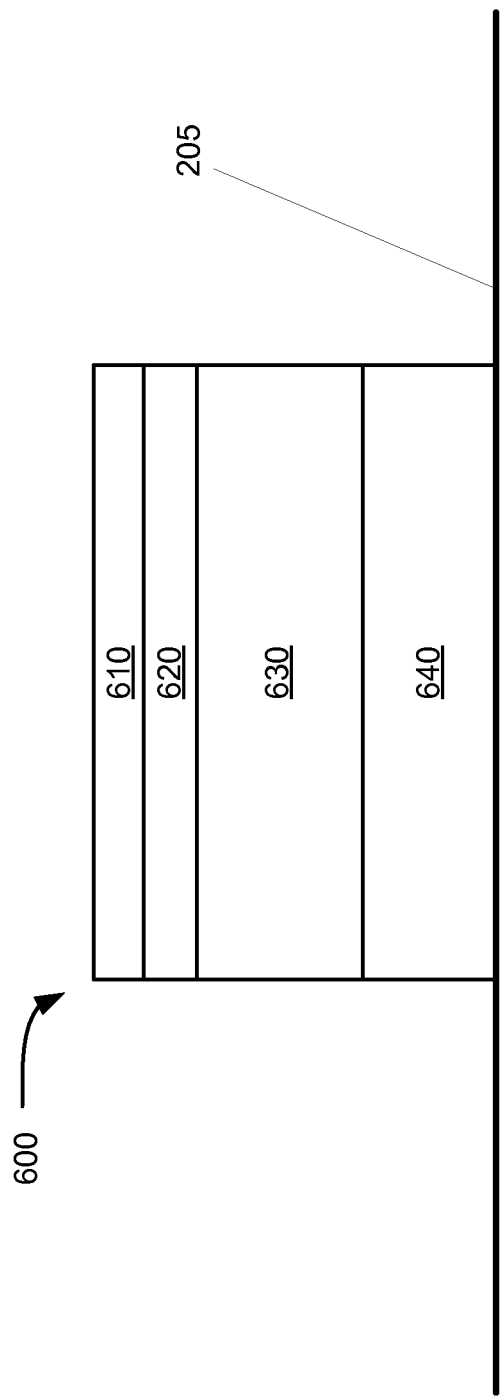

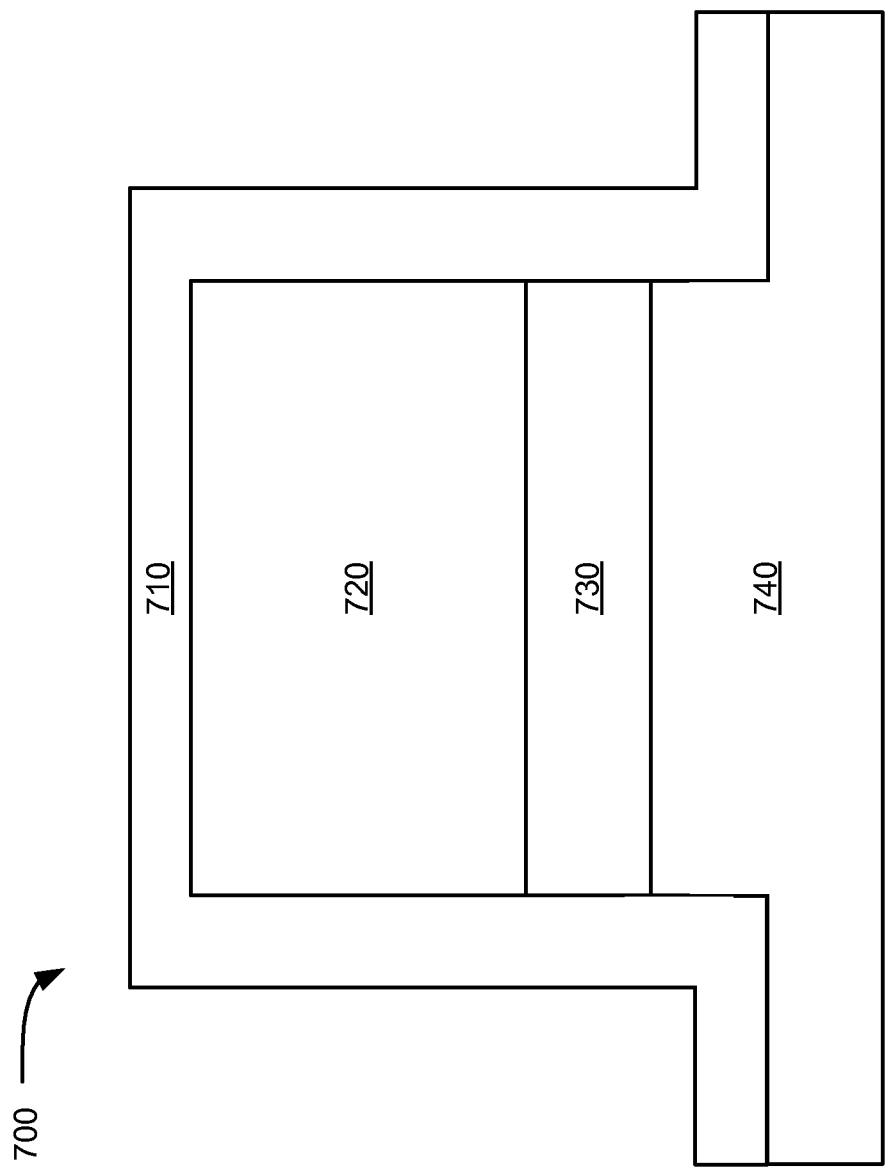

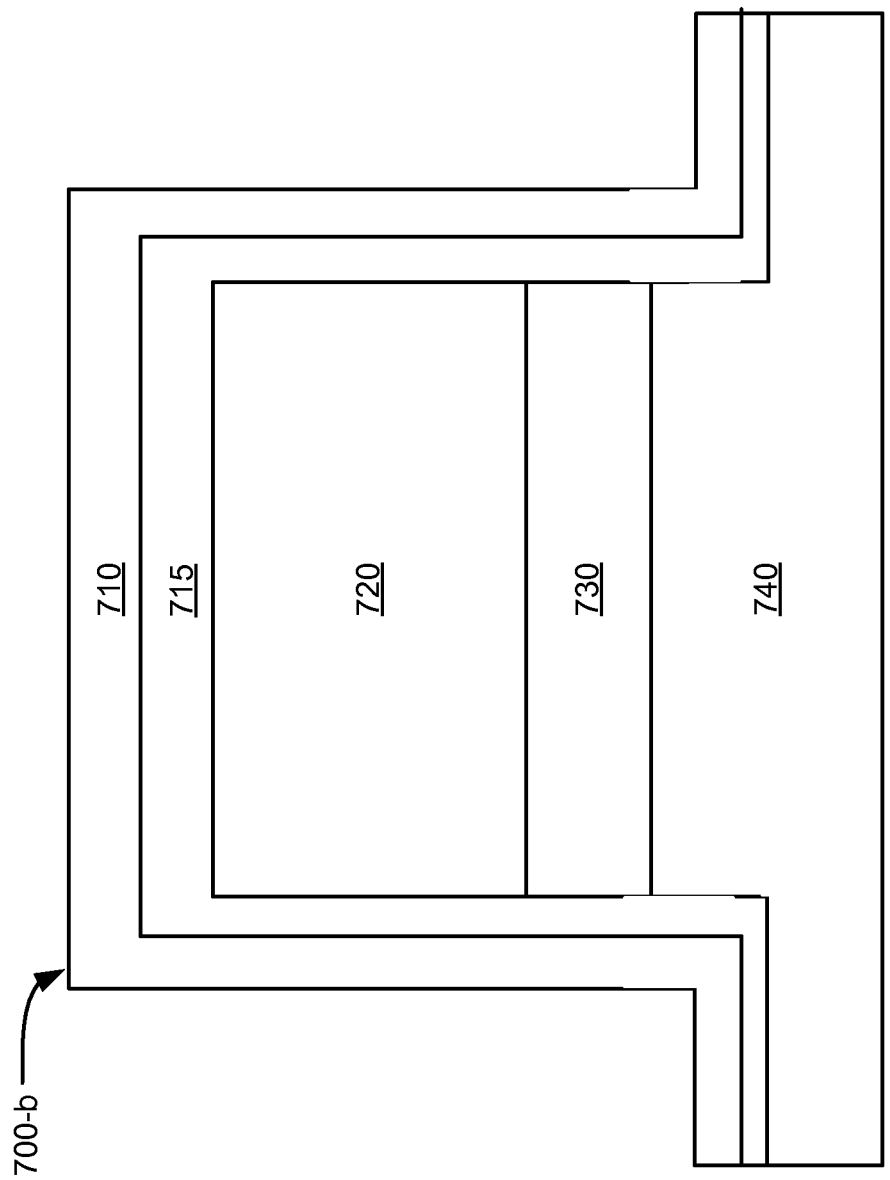

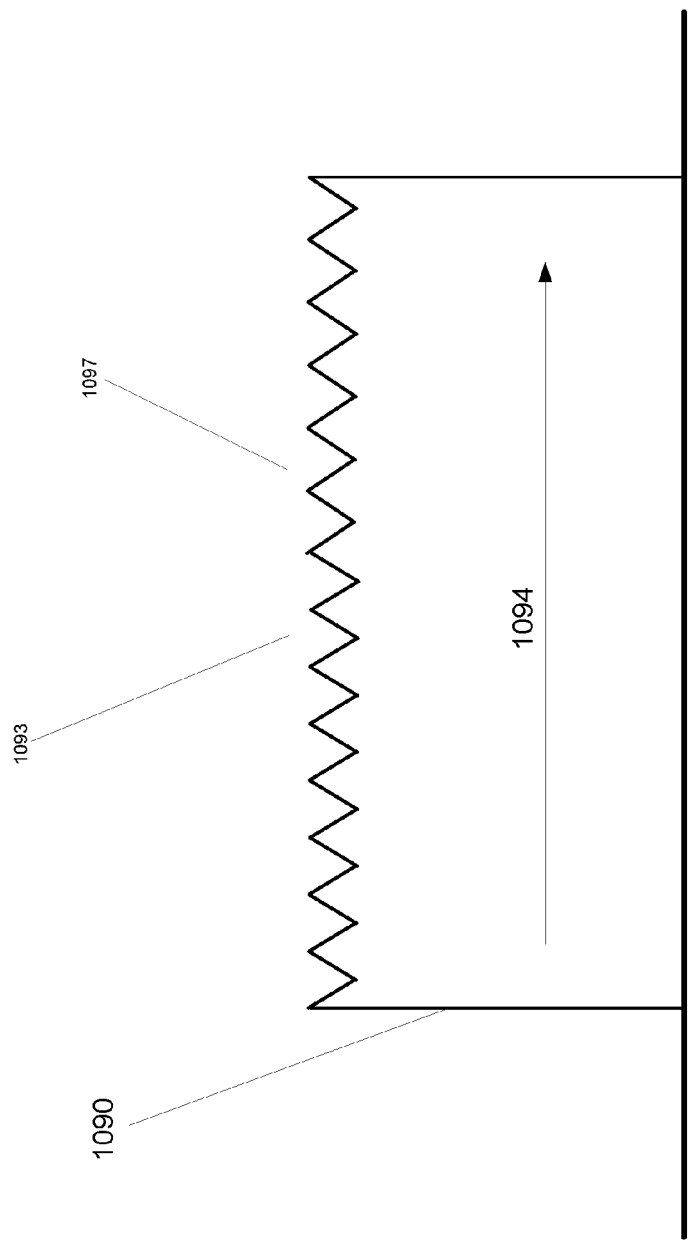

LIGHT ABSORPTION AND SCATTERING DEVICES IN A PHOTONIC INTEGRATED CIRCUIT THAT MINIMIZE OPTICAL FEEDBACK AND NOISE

BACKGROUND

Wavelength division multiplexed (WDM) optical communication systems are known in which multiple optical transmitters supply each of a corresponding one of a plurality of modulated optical signals. The optical signals may be combined by an optical combiner or multiplexer in a transmit node and supplied to an end of an optical communication path. The combined optical signals may then propagate along the optical communication path to a receive node, where the optical signals are demultiplexed and each is supplied to a corresponding optical receiver.

Each optical transmitter may include a laser that outputs light having a particular wavelength and a modulator that modulates the light in accordance with a data stream to provide a respective one of the modulated optical signals. Other optical components may also be provided. Typically, optical fibers or other waveguides are provided to direct light from one component to the next, e.g., from the laser to the modulator, and from the modulator to the combiner. An interface may exist between an end face of the fiber and part of the component that receives the light. Light may scatter at such interfaces, and such scattered light may be fed back to the laser and interfere with the operation of the laser. Alternatively, the scattered light may interfere with optical signals propagating in the waveguides. Often the waveguides are tilted or angled in such a way as to reduce such scattering back into the source waveguides and the lasers whereby the waveguide may "dodge" the scattered light.

In another example, the optical combiners or couplers may include a portion through which unwanted portions of the combined optical signals may escape. Such light may also constitute undesired feedback to the lasers as well as interfere with optical signals propagating in the waveguides. Accordingly, additional waveguides may be provided at such "dump ports" to direct the undesired light away from waveguides carrying optical signals and the lasers.

Conventional WDM optical communication systems often include discrete components, such that, for example, the lasers, modulators, and other components are housed separately from one another or provided on separate substrates. Other WDM optical communication systems, however, include photonic integrated circuits (PICs) in which these components may be integrated on a common substrate. As the density and size of PICs increases, the conventional approaches to reducing scattered light may be impractical due to the layout or configuration of various components on the PIC.

Accordingly, there is a need for devices that can be readily integrated on a PIC and reduce unwanted light.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 5-7a, and FIG. 7b are diagrams of example absorptive structures; and

DETAILED DESCRIPTION

Figure 1:
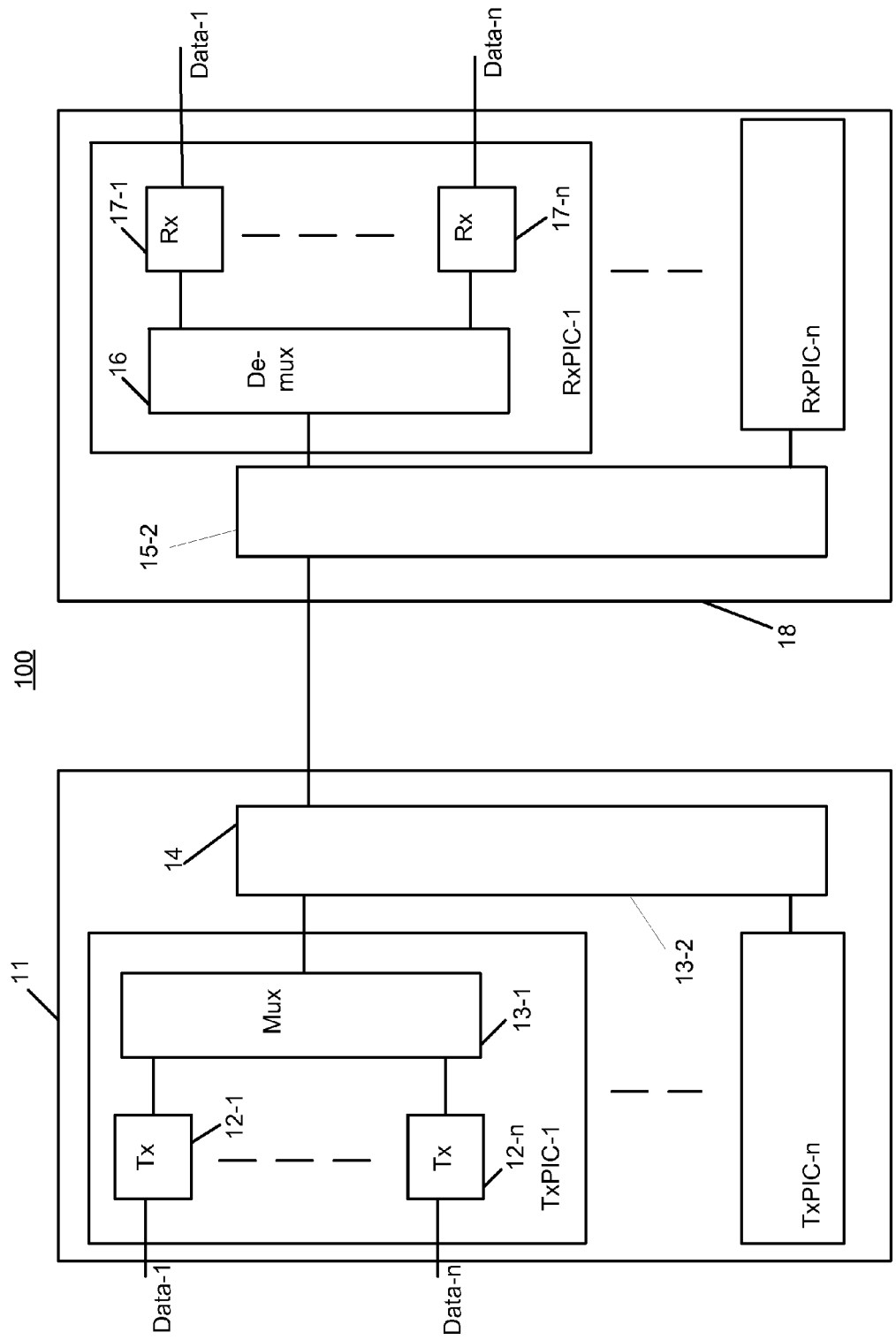
FIG. 1 illustrates a block diagram of an optical communication system consistent with the present disclosure.

The following detailed description refers to the accompanying drawings. The same reference numbers in different drawings may identify the same or similar elements.

Various devices are proposed to minimize optical feedback to the laser or optical noise in the signals supplied from the output waveguides of the PIC. For example, devices may be provided to capture and absorb unintentionally scattered light that escapes from a waveguide or is present in the substrate. In another example, structures may be provided to disperse or scatter light output from a dump port of a coupler. As used herein, a "dump port" is a waveguide that supplies guided optical light that is not intended as an optical or electrical output.

The devices may include semiconductor layers that constitute other components on the PIC and thus may be easily manufactured and readily integrated on the PIC. These devices may include a waveguide core that captures unguided light, and a layer, such as a metal, that absorbs the captured light. In one example, a spiral waveguide is provided, as a scattering structure, and in another example, a multi-mode interference (MMI) device is provided that has a tapered structure. Alternatively, combinations of these devices may be provided at various locations on the same PIC.

In one implementation, the absorbing and/or scattering devices can be placed in locations along a path or adjacent to a path between where the unwanted light originated and where the unwanted light can interfere with an optical signal (from wanted light) being received by the receiver. For example, the absorbing and/or scattering devices can be placed near the optical sources, near waveguides, and/or near the multiplexers or receivers.

Additionally, the absorbing and/or scattering devices can be located at locations where scattering may be expected to occur, such as at places of device discontinuity, bends in a waveguide, and/or locations where light is intentionally scattered. For example, the absorbing and/or scattering devices can be placed near devices in the PICs, at bends in the waveguides, and/or at guided terminal ports (e.g., input ports, output ports or dump ports) or terminal ends of waveguides. Further, structures consistent with the present disclosure may be provided at transitions between different wave-guiding structures (e.g., transitions between epitaxial layers, such as a butt joint, and transitions between deep and shallow-etched waveguide).

In one or more implementations, absorbing devices can include band gap absorption devices, metallic absorption devices, and/or absorptive guidance devices, and scattering devices can include optical devices that scatter light using geometric structures. By absorbing unintentionally scattered light and scattering light from a coupler dump port, for example, optical feedback to the laser is minimized which would otherwise cause broadening of the laser line-width. In addition, phase, amplitude, and spectral noise in the optical signals output from the PIC is reduced. Scattering and capturing/absorbing devices, as disclosed herein are passive, and do not require application an electrical bias, such as a current or voltage bias, as in the case of known active absorption techniques. Accordingly, the devices disclosed herein do not consume power and dissipate minimal power through passive absorption, which may include grounding various diode structures discussed below. As a result, scattering and light capturing/absorbing structures consistent with the present disclosure do not appreciably heat the PIC, as opposed to active absorption devices. Reverse-biasing the diodes disclosed herein can improve absorption efficiency, but with increased power consumption. Such reverse biasing, however, is unnecessary.

Further, the structures disclosed herein may include the same epitaxial layers as other devices in a PIC. In addition, there is no need to rout the undesired light off the substrate or PIC. More compact PIC layouts can minimize power consumption.

An exemplary system which may include absorbing and/or scattering devices will next be described below with reference to FIGS. 1-3. Detailed descriptions of examples of the absorbing and/or scattering devices follow the system description.

FIG. 1 illustrates an optical link or optical communication system 100 consistent with an aspect of the present disclosure. Optical communication system 100 include a transmit node 11, which may have a plurality of photonic integrated circuits (TxPIC-1 to TxPIC-n, collectively to herein as a TxPICs). Each TxPIC may further include a plurality of transmitter blocks (Tx Block) 12-1 to 12-n provided. Each of transmitter blocks 12-1 to 12-n receives a corresponding drive signals associated information streams Data-1 to Data-n supplied to node 11. In response to such drive signals, each of transmitter blocks 12-1 to 12-n may output a group of optical signals or channels to a combiner or multiplexer 13-1. Each optical signal carries an information stream or data corresponding to each of data streams Data-1 to Data-n. Multiplexer 13-1, which may include one or more optical filters, for example, combines each of group of optical signals into a wavelength division multiplexed (WDM) that is output to an additional multiplexer 13-2, that combines the optical signal outputs from each TxPIC onto optical communication path 14. Optical communication path 14 may include one or more segments of optical fiber and optical amplifiers, for example, to optically amplify or boost the power of the transmitted optical signals.

As further shown in FIG. 1, a receive node 18 may also be provided that includes an optical decombiner or demultiplexer 15-1, which may include one or more optical filters or deinterleavers. For example, optical demultiplexer 15-1 may supply each group of received optical signals to a corresponding one of receiver photonic integrated circuit (RxPIC-1 to RxPIC-n, collectively or individually referred to herein as RxPICs) 22-1 to 22-n. Each RxPIC has a demultiplexer 15-2, which supplies each optical signal within each group to a corresponding one of receiver blocks 22-1 to 22-n. Each receiver block, in turn generates corresponding electrical signals, which are then processed by various circuitry (not shown in FIG. 1) to output copies of data streams Data-1 to Data-n from receive node 18. It is understood that each of the remaining TxPICs in node and each of the RxPICs in node 18 may operate in a manner similar to that discussed above to supply data carrying along optical communication path 14.

Figure 2A:
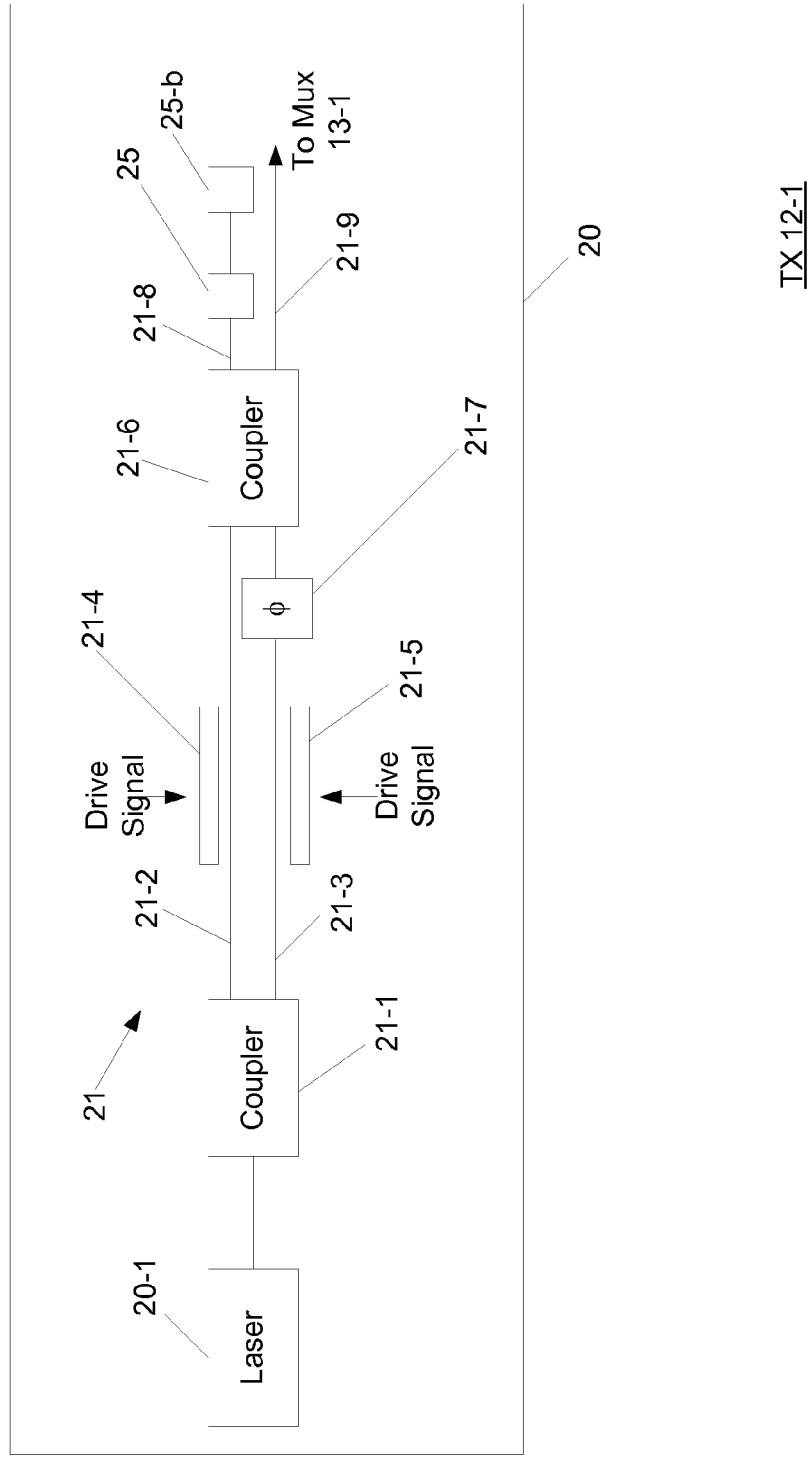
FIG. 2a illustrates a block diagram of an example of an optical transmitter block consistent with a further aspect of the present disclosure.

One of transmitter blocks 12-1 is shown in greater detail in FIG. 2. It is understood that remaining transmitter circuitry or blocks 12-2 to 12-n have the same or similar structure as transmitter block 12-1. Transmitter block 12-1 may include a substrate 20 and a laser 20-1 that may be provided on the substrate. Alternatively, laser 20-1 may be provided as a discrete device spaced from substrate 20. Laser 20-1 may be operated in a continuous wave (CW) mode to continuously output light to a modulator, such as a Mach-Zehnder modulator 21. Modulator 21 may include a first coupler, such as a multi-mode interference (MMI) coupler 21-1, and a second coupler 21-6, such as MMI coupler 21-6, as well as first and second waveguides or arms 21-2 and 21-3 extending therebetween. A known phase shifter (e.g., 90 degrees) 21-7 may also be provided to shift the phase of light propagating in arm 21-3. Drive signals may be applied to electrodes 21-4 and 21-5 to vary a bias applied to arms 21-2 and 21-3, respectively, in accordance with data carried by each drive signal. In response to such varying bias, the refractive index of each arm changes, such that the phase of light propagating in each arm also changes. As a result, when light form each arm 21-2 and 21-3 is combined in coupler 21-6, the phase and/or amplitude of light output from port 21-9 of coupler 21-6 is varied in accordance with the data associated with the drive signals supplied to electrodes 21-4 and 21-5.

It is noted that a so-called "nested Mach-Zehnder" modulator may also be provided instead of the modulator configuration shown in FIG. 2. In the "nested configuration" the light output from laser 20-1 may be split into first and second portions, which are supplied to first and second Mach-Zehnder modulators, respectively. These modulators, in turn, may phase and/or amplitude modulate the light supplied thereto, and the outputs of the modulators may then be combined. Optical signals output from "nested" modulators may carry data at twice the rate as modulators having the structure shown in FIG. 2. In addition, two such nested modulators can be provided in a polarization multiplexed configuration. An example of such a configuration is described, for example, in U.S. patent application Ser. No. 12/981,835 filed Dec. 30, 2010, the entire contents of which are incorporated herein by reference.

As further shown in FIG. 2, coupler 21-6 has a so-called "dump port", which, as noted above, outputs unwanted light resulting from optical interactions within coupler 21-6. Consistent with the present disclosure, however, an integrated absorbing or scattering structure 25, for example, may be provided at dump port 21-8 to absorb such unwanted light. Various exemplary structures suitable for absorbing and/or scattering unwanted light are discussed in greater detail below with reference with FIGS. 5-7a,7b, 8-10a, and 10b.

Typically, structure 25 is not biased with a voltage. However, a biased element 25-b may optionally be provided in addition to structure 25 to absorb any light that is not absorbed or scattered by structure 25. Element 25-b will next be described in greater detail below with reference to FIG. 2b.

Figure 2B:
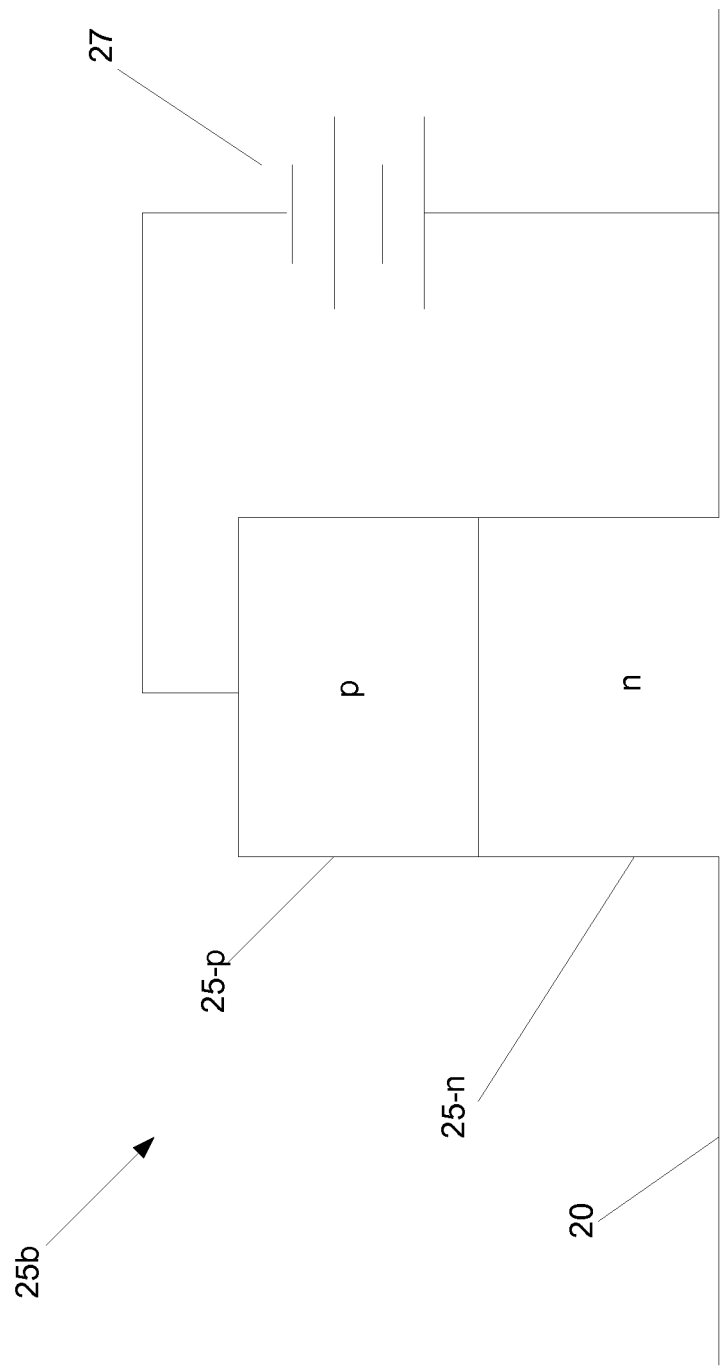
FIG. 2b illustrates an example biased element consistent with a further aspect of the present disclosure.

As shown in FIG. 2b, element 25-b may have a diode structure including a p-type semiconductor region 25-p and an n-type region 25-n provided on substrate 20. A power supply 27 may also be provided to reverse bias element 25-b. As a result, residual light output from structure 25 may be absorbed by a depletion region (not shown) formed at a junction between regions 25-p and 25-n.

As noted above, optical signals output from node 11 and multiplexer 13-2 propagate along optical communication path 14 to receive node 18, where the optical signals are separated into groups by demultiplexer 15-1, and each optical signal group is provided to a respective one of RxPIC-1 to RxPIC-n. In RxPIC-1, one of the optical signal groups is demultiplexed by demultiplexer 15-2 and each optical signal in that group is supplied to corresponding one of receivers (Rx) 17-1 to 17-n.

Figure 3:
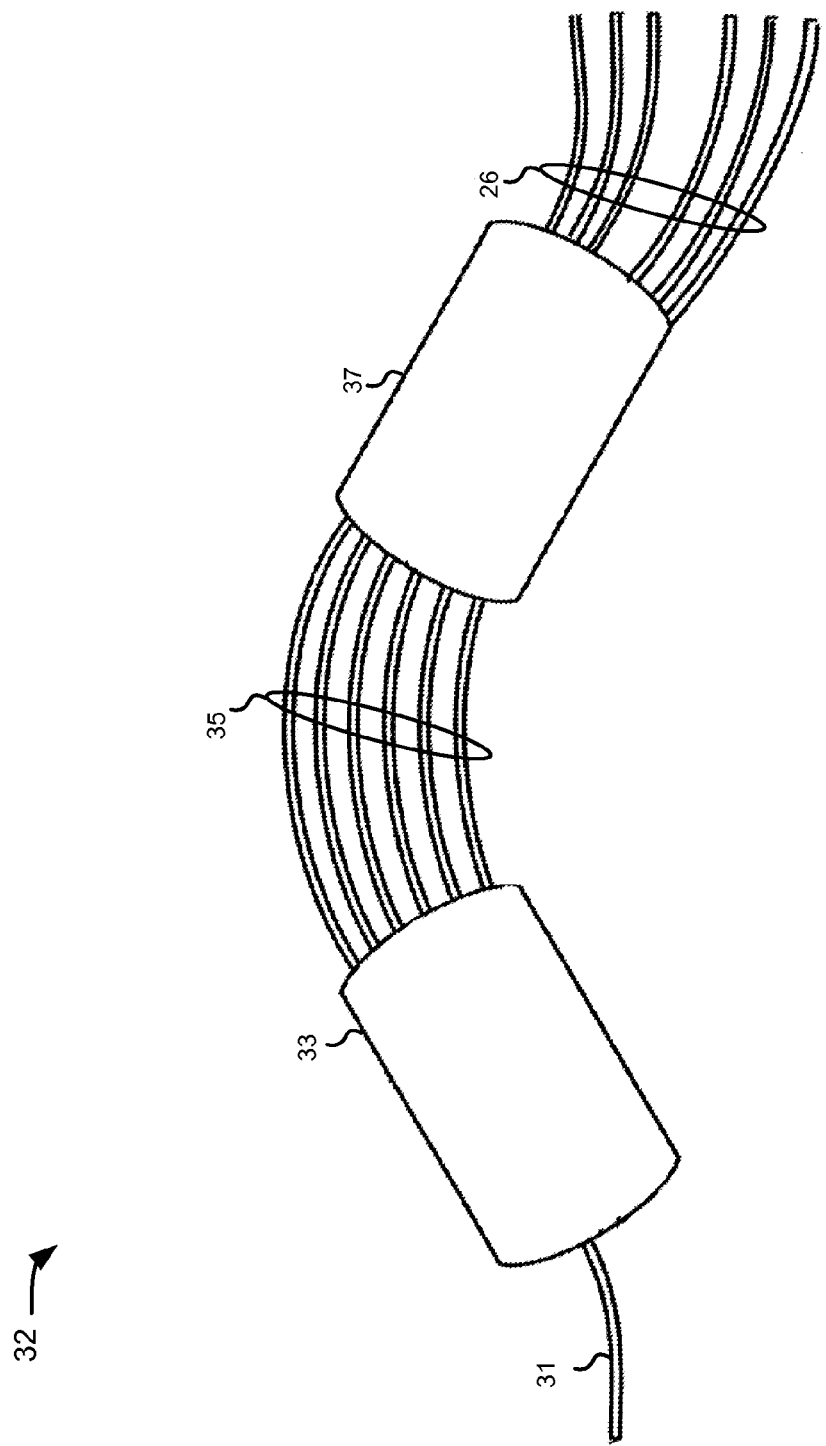
FIG. 3 illustrates an arrayed waveguide grating (AWG) consistent with an additional aspect of the present disclosure.

In one example, demultiplexer 15-2 may include an arrayed waveguide grating (AWG), such as AWG 32 shown in FIG. 3. AWG 32 may include an input waveguide 31 which supplies the optical signal group to a free space region or first dielectric slab 33. AWG 32 also includes waveguides, also referred to as grating waveguides 35, and a second dielectric slab 37. As generally understood, the lengths, widths, and other dimensions/properties of slabs 33 and 37, as well as waveguides 35, may be selected so that AWG 32 may be configured as an optical demultiplexer to supply each optical signal to a respective one of output waveguides 26. Each of output waveguides 26, in turn, provides a respective optical signal to a corresponding one of receivers 17-1 to 17-n. As generally understood, in the demultiplexer configuration, each optical signal is directed to or focused on to an edge of slab 37 adjacent a corresponding one of waveguides 26.

Figure 4:
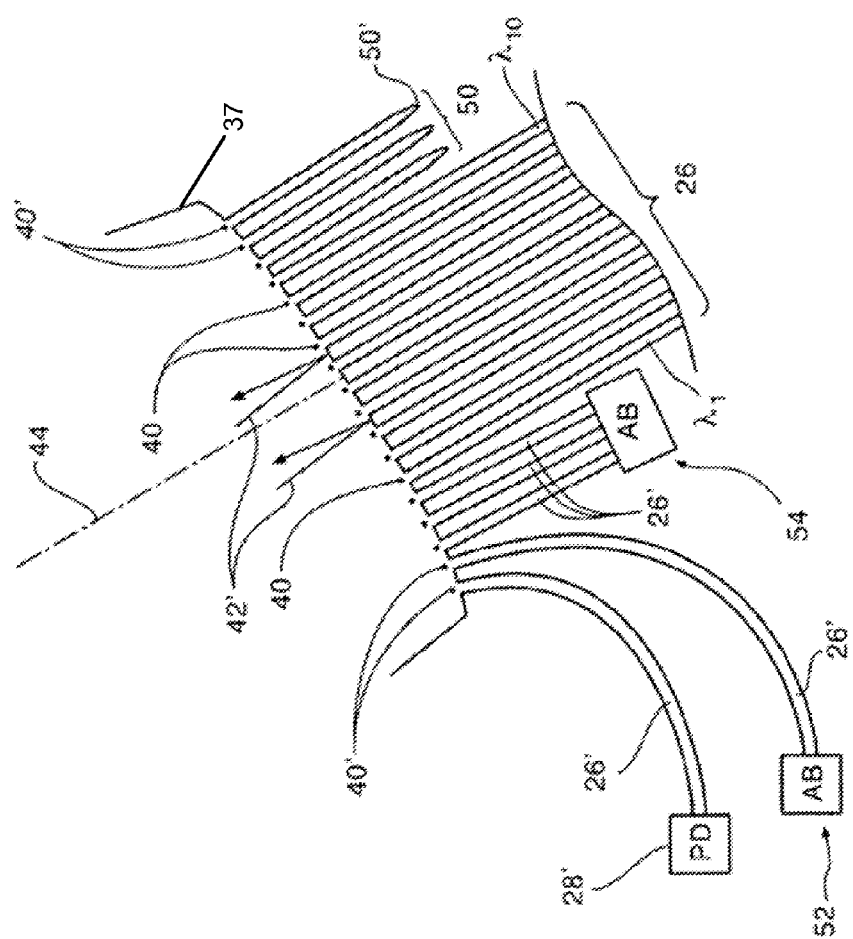
FIG. 4 is an enlarged view of a portion of the AWG shown in FIG. 3.

FIG. 4 shows a portion of AWG 32 including second slab 37 in greater detail. In this example, reflection suppression structures in the form of waveguide structures 50, 52 and 54 adjacent a substantial number of focal points 40' are provided, such that relatively little light remains to reflect off the output interface 18B of slab 37. Since there are losses associated with the reflected light, waveguides 50, 52 do not need to be placed adjacent each and every focal point as the reflected light from some focal points will lack sufficient energy to pass back through AWG 37. Moreover, some of these focal points 40 may be within a higher order Brillouin zone, and therefore be of lower power. Waveguides 50 are fabricated such that a first end portion of the waveguide 50 is coupled to the output interface 18B at a point adjacent to a focal point 40, guiding the light energy from second slab 37 to the respective waveguide 50. As depicted, a second end portion or distal end of each waveguide 50 includes a tapered portion 50' which dissipates the optical energy within the surrounding substrate. More specifically, as the light enters the tapered portion 50' of the distal end of waveguide 50 the mode of such light expands, and the light is absorbed in the surrounding substrate.

Alternatively, waveguides can be constructed to couple the light energy associated with any one focal point on an edge of slab 37 to a light absorbing material. For example, as further shown in FIG. 4, a waveguide 52 can couple the light energy of the associated focal point 40 to a light capturing or absorbing/capturing structure AB, examples of which are discussed below. Waveguide 52 can be curved away from the main signal channel grouping, as shown, to further move the light energy away from the signal channel waveguides 26 to minimize contamination of the signal channels. Additionally, multiple waveguides may be directed to a well of light absorption material. For example, as depicted, waveguides 54 may each couple the light energy of an associated focal point 40 to the light absorbing material AB. Absorbing material AB may be any suitable material which will absorb light energy to reduce, or otherwise suppress, reflection of the associated light. Such optical energy absorbing materials include any semiconductor material, or other material, with a band gap smaller than the propagating light, such as InGaAs or InGaAsP. While it is preferably to couple the light absorbing material AB to slab 37 through the use of one or more waveguides 26' due to space constraints, light absorbing material AB can be positioned adjacent to the output interface 18B without the need for waveguides 26'. While not necessary, the waveguides 26' may include curved portions to move the light energy away from the waveguide 26 and the signal channels traveling along the waveguides 26, isolating the light energy from the signals channels and minimizing any optical interference with the light energy of waveguides 26. Additionally, the curved waveguide portions depicted herein for illustrative purposes and are not drawn to scale. As one of ordinary skill would appreciate, such curved waveguide portions can impact the light energy due to their corresponding radius of curvature, therefore waveguides 26' preferably include curved portions to provide better optical isolation while maintaining the integrity of the optical output signal channels transmitted by waveguides 26. Examples of AWG configurations are also described in U.S. Pat. No. 7,974,504, the entire contents of which are incorporated herein by reference. Similarly, as depicted, a waveguide 26' may be coupled to the output free space region 18 of AWG 14 at the location of one of the focal points 40, coupling the corresponding signal channel to an active device, such as photodetector 28', similar to photodetector 28 for example. In this case, no reflected optical energy from the photodiode 28' or waveguide 26' back toward the output free space region 18 is perceived, the light energy optically transmitted from the output free space region 18 through the waveguide 16' and to the photodetector 28' where the light energy is absorbed. In should be noted that a photodetector, such as photodetector 28', can be positioned on the input interface 16A of input free space region 16 to measure optical energy which is representative of the amount of light which is reflected off the various interfaces 16B, 18A, and 18B, back into AWG 14.

Thus light absorbing/scattering structures may be provided in both the TxPICs and RxPICs. Examples of such structures will next be described with reference to FIGS. 5-10b. Namely, FIGS. 5-10b illustrate example implementations of light capturing/absorptive structures AB shown in FIG. 4. Light capturing/absorptive structures AB can be made of a variety of materials and can be made in a variety of configurations.

FIG. 5 is a diagram of an example implementation of a guided absorptive/scattering AB with absorptive core structure 500 that includes an absorptive core, which can absorb unwanted guided light. In one implementation, absorptive core structure 500, a cross-section of which is shown in FIG. 5, can include p-contact 510, first p-type layer 520, second p-type layer 530, n-type layer 550, and n-contacts 560, along with light absorptive core 540, which may include intentionally undoped or intrinsic semiconductor material. In one implementation, first p-type layer 520 can include AlGaInAs, GaInAsP or GaInAs, second p-type layer 530 can include InP or AlInAs, n-type layer 550 can include InP or AlInAs, and light absorptive core 540 can include a semiconductor material, such as GaInAs, GaInAsP or AlGaInAs, and can include a bulk layer, quantum wells and barriers, quantum dots or the like. In another implementation, first p-type layer 520 can include other p-type semiconductor materials, such as GaAs, AlGaAs or GaN, second p-type layer 530 can include other p-type semiconductor materials, such as GaAs, AlGaAs, AlGaN or GaN, n-type layer 550 can include other n-type materials, such as GaAs, AlGaAs, AlGaN or GaN, and light absorbent core 540 can include a semiconductor, such as GaAs, AlGaAs, InGaAs, GaN or InGaN. In another implementation, absorptive core structure 500 can include additional layers, different layers, or fewer layers.

Light absorptive core 540 can be made of any light-absorptive material that can provide band gap absorption of the stray light, such as a semiconductor or semiconductor compound or another band gap absorptive material with an appropriate band gap (e.g., C-band (1530-1560 nm), S-band (1460-1530 nm)). In one implementation, the material for light-absorptive core 540 can be chosen for absorbing light (e.g., unwanted light) based upon the frequency of the light produced by a nearby light source. For example, if an optical source, such as a laser in transmitter block 12-1, is creating light at a particular frequency, then the stray light would be at the same particular frequency, and the absorptive core material can be chosen to absorb light at the particular frequency (or at other frequencies of adjacent optical sources including or excluding the particular frequency).

As illustrated in FIG. 5, absorptive core structure 500 can include a resistor or diode geometry with light absorptive core 540 located within the geometry. In a diode geometry, structure 500 includes contact 510 and contacts 560. In one example, contacts 510 and 560 may include a metal or other suitable conductor. In addition, p-type layers 520 and 530 are provided, and an n-type layer 550 is provided between the contacts 510 and 560. Typically, when structure 500 has a diode geometry, a reverse bias (e.g., connecting p-type contact 510 with a negative terminal and connecting n-contacts 560 with a positive terminal) may be applied which to increase the amount of light that can be absorbed by light absorptive core 540.

In addition, to the diode geometry described above, structure 500 may constitute a resistor. In that case, each of layers 520, 530, 540, and 550 may have the same conductivity type. FIG. 6 is a diagram of an example implementation of light capturing/absorptive structure 600. Here, structure 600 includes an optional cladding layer 640 and a core layer 630, which are configured to capture unguided or scattered light in substrate 205. Metal layer 610, which may include a refractory metal, has an appropriate thickness to absorb light that is captured in core 630. In one implementation, an additional cladding layer 620 is provided between metal layer 610 and core layer 630. Cladding layer 620, however, is unnecessary if core layer 630 has sufficient optical thickness. In addition, core layer 630 may be absorptive, and cladding layers 620 and 640 may include InP Preferably, the refractive index of cladding layers 620 and 640 is less than core layer 630. In another implementation, metal containing absorptive structure 600 can include additional layers, different layers, or fewer layers than that shown in FIG. 6.

As noted above, absorptive metal layer 610 may be provided to absorb light captured by core layer 630 that was unguided in PIC 206. For example, absorptive metal layer 610 can be used to absorb light that was unintentionally scattered due to light escaping from a waveguide or any guided component of PIC 206.

Absorptive metal layer 610 may be a light absorbing layer including any metal, such as Ti, W, Al, Au, or combinations thereof, e.g., alloys or multiple metal layers. The amount of light absorbed can depend on material properties, such as composition, temperature, surface roughness, oxide layers and contamination, and also the device geometry that can enhance overlap of guided light to the absorptive metal. In addition, core layer 630 may capture scattered light from underlying layers or the substrate into a guided mode having significant overlap with the absorptive metal 610, thereby enhancing overall efficiency of the absorptive structure.

FIG. 7a is a diagram of an example implementation of a guided absorptive/scattering structure AB, with Light Absorbing Metal (LAM) structure 700-a that includes a LAM, which can absorb unwanted guided light. In one implementation, LAM structure 700-a, a cross-section of which is shown in FIG. 7, can include LAM layer 710, p-type material layer 720, guiding core layer 730, and n-type material layer 740. In another implementation, LAM structure 700-a can include additional layers, different layers, or fewer layers.

In one exemplary implementation, undoped or p-type material layer 720 can include InP, and undoped or n-type material layer 740 can include InP. Additionally, or alternatively, LAM structure 700-a may be passive and can be provided with LAM layer 710 on three sides of optical core layer 730 provided that LAM layer 710 is sufficiently close to optical core 730 to absorb light, but not so close as to prevent light from being guided. LAM layer 710 may assist in absorption of unwanted light in PIC 206 by absorbing guided light, such as light from a dump port. LAM layer 710 may be a light absorbing layer including any metal, such as Ti, W, Al, Au, or combinations thereof, e.g., alloys or multiple metal layers.). FIG. 7b shows an alternative LAM structure 700-b, which is similar to LAM structure 700-a, but includes a relatively thin dielectric layer 715 beneath LAM layer 710. Preferably, dielectric layer 715 is sufficiently thin so that it can be penetrated by the guided light and absorbed by LAM layer 710. The thickness and refractive index of layer 715 can also be chosen to maximize light absorption in the guided structure 700-b, for example, to minimize coupling loss from a waveguide to the absorptive structure. The thickness of refractive index layer 715 may also minimize the input and absorbing section.

Figure 8:
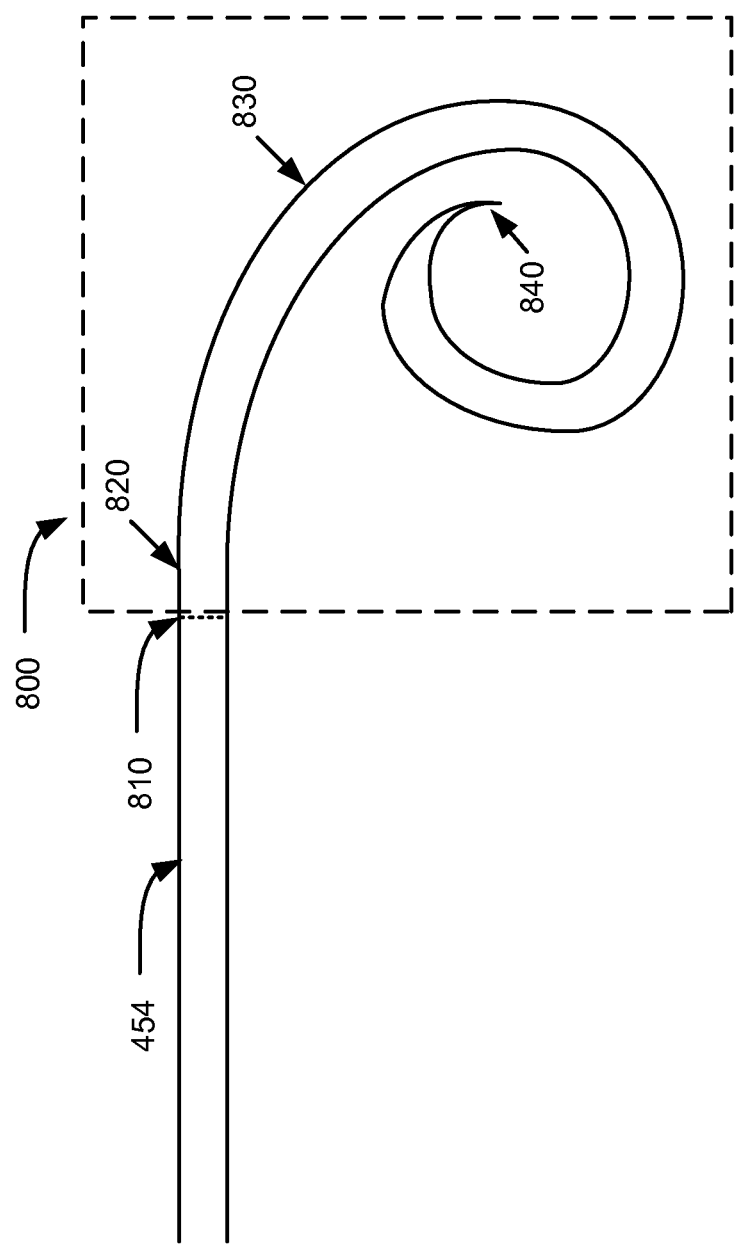
FIGS. 8-10c are diagrams of example scattering structures.

FIG. 8 is a diagram of an example implementation of a guided absorptive/scattering structure AB including spiral waveguide structure 800 that can include a spiral configuration at a terminal end of a waveguide to scatter unwanted light guided by the waveguide. Spiral waveguide structure 800 can be used in series with other guided absorptive/scattering structures AB. In one implementation, spiral waveguide structure 800, a top view of which is shown in FIG. 8, can include a first portion 820 located near a terminal end 810 of waveguide 454, a second portion 830 that bends upon itself with tight enough radius of curvature to allow light to radiate, and a third portion 840 that terminates to promote scattering more significantly than reflecting. Also note that sections 830 and 840 can have improved performance if the etch depth is reduced by etch loading and/or by mask and etch design. It can also have improved performance if the core is absorptive instead of transparent.

Spiral waveguide structure 800 can be made of the same material as waveguide 454, and can be shaped to become progressively narrower and spiraled to cause guided light in waveguide 454 to scatter while suppressing back-reflected light.

Additionally, or alternatively, spiral waveguide structure 800 may be fabricated as any sized structure. In one implementation, spiral waveguide structure 800 can be provided if the fabrication process, geometry limitations, or other restraints make absorptive structures (or other scattering structures) impractical or impossible on a TxPIC or RxPIC. For example, a progressively narrowing, spiral waveguide structure 800 can effectively scatter initially guided light with low return loss. As another example, one or more spiral waveguide structures 800 may be fabricated into compact structures that may fit between waveguides or any other components in either the TxPICs or the RxPICs.

Figure 9:
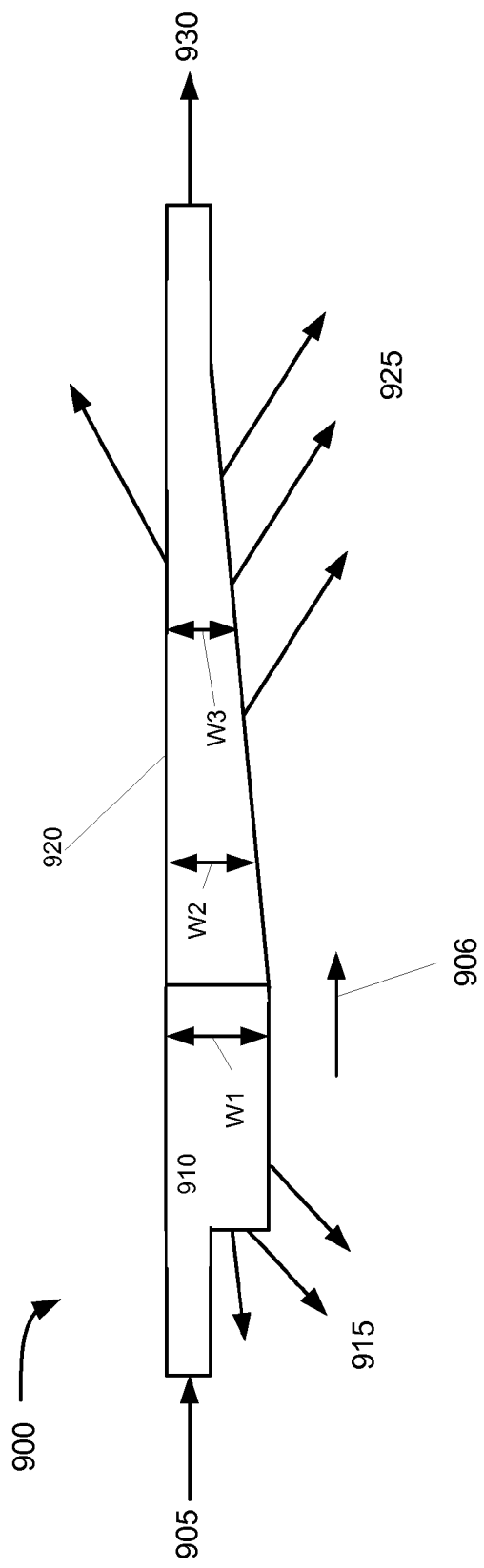

FIG. 9 is a plan view of another example of absorptive/scattering structure AB, which includes a "tapered" MMI 900. MMI 900 may include a single-mode input waveguide 905 that receives undesired or stray light propagating in a direction indicated by arrow 906 from a dump port, for example, or another source. MMI 900 may further include a multi-mode waveguide section 910, tapered section 920, and light output portion 930. Section 910 may have a constant width W1 that extends in a direction transverse to arrow 906. Section 920, however, has a tapered width that narrows in the direction of light propagation. Accordingly, as further shown in FIG. 9, section 920 has a width (W2) adjacent section 910 that is greater than a width (W3) near output portion 930. Widths W2 and W3 also extend in a direction transverse to the optical signal propagation direction.

A transition between sections 910 and 920 is abrupt and non-adiabatic. In that case, MMI 900 may be configured so that undesired light is not reflected back to input waveguide 905. Rather, such undesired light is scattered out the sides of MMI 900 (see arrows 915 and 925) and/or into the substrate instead.

Tapered MMI device 900 can be made of the same material as waveguide 130. In another implementation, tapered MMI device 900 can be made of a different material from waveguide 130, and can include more than one material, including transparent and absorptive materials.

Additionally, or alternatively, tapered MMI device 900 can suppress reflected light from returning to input waveguide 905 by using a combination of tapered MMI device 900 and one or more additional absorptive/scattering structures. In one implementation, tapered MMI device 900 can transmit light away from input waveguide 905, scatter light 915, 925, and direct remaining light to output waveguide 930 that can then be fed into one or more additional absorptive/scattering structures. For example, spiral waveguide structure 800 can be attached to tapered MMI device 900, such that the input 810 of spiral waveguide structure 800 is attached to output waveguide 930 of tapered MMI device 900.

Figure 10A:
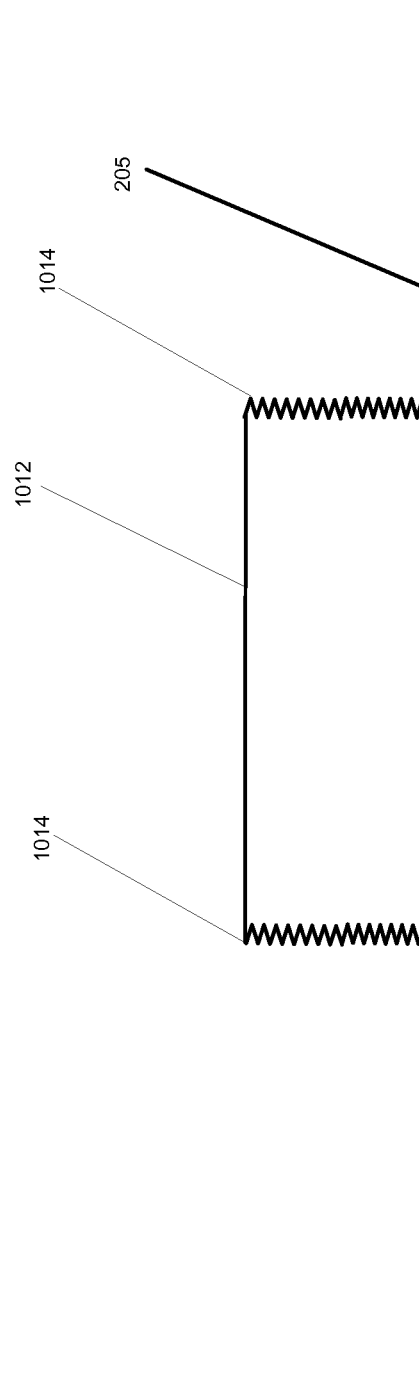

FIG. 10a is a cross-sectional view of another example of a scattering structure including a waveguide 1012 having sidewalls 1014, which are either chemically or pattern-roughened to provide feature sizes greater than 0.5 microns. Roughened sidewalls 1014 scatter light that may be output from a dump port, such as a dump port of an MMI coupler.

Figure 10B:
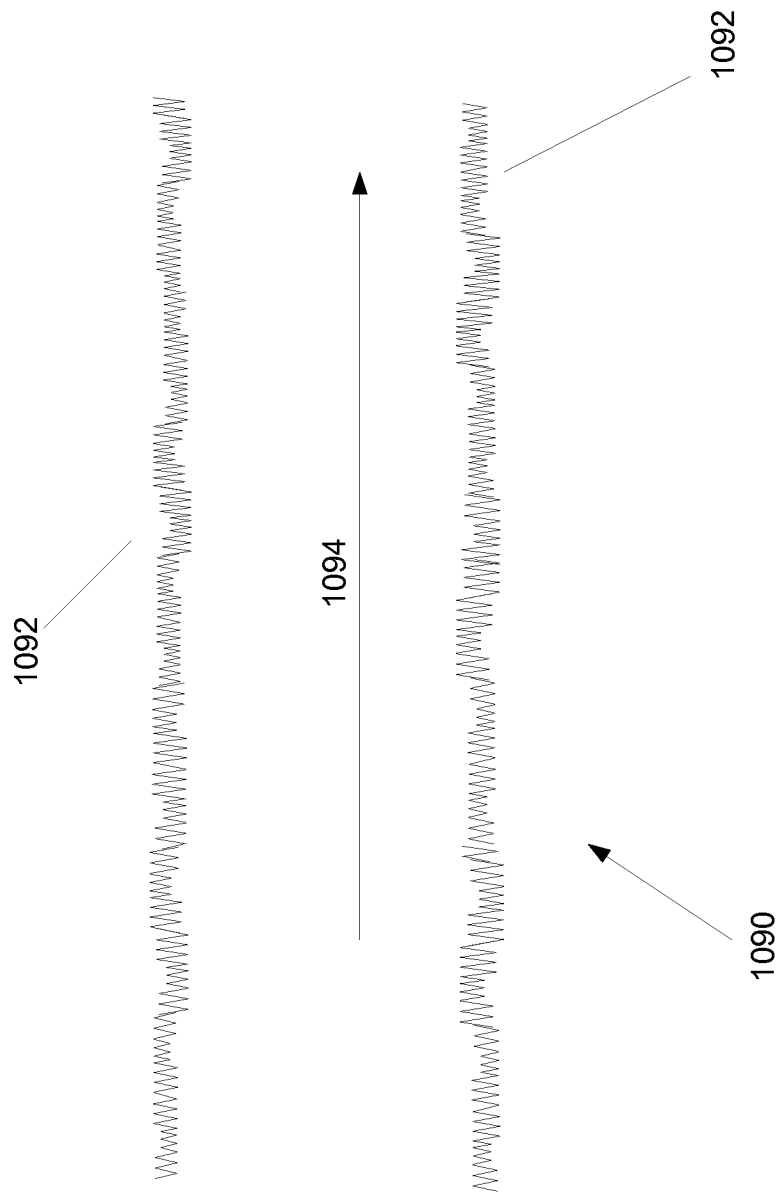

FIG. 10b is a plan view of a waveguide 1090 having patterned sidewall 1092. Such patterned sidewalls have feature sizes greater than 0.5 microns and may be configured to scatter light output from a dump port and propagating in waveguide 1090 in a direction indicated by arrow 1094. Alternatively, the sidewalls may be roughened to have feature sizes less than the wavelength of light propagating in waveguide 1090. Alternatively, waveguide 1090 may be formed with a periodic pattern or grating to scatter light propagating therein. For example, as shown in FIG. 10c, a periodic pattern, such as a plurality of grooves constituting a grating 1093, may be provided, e.g., etched, in surface 1097 of waveguide 1090 to scatter the light.

As discussed herein, guided absorptive/scattering structures AB can be specifically selected based on the type of absorbing and/or scattering desired in a particular location and/or for a particular purpose.

Selection of which light capturing/absorptive structures AB and can be made based upon several factors, such as space available, aspect ratios, type of unwanted light (guided vs. scattered), or amount of unwanted light. For example, spiral waveguide structures 800 and tapered MMI devices 900 may be fit between waveguides or other components, while other guided absorptive/scattering structures AB may not. As another example, metal-absorptive structure 600 can advantageously be selected to be placed after bends in waveguides to absorb unwanted, unguided light that may escape from a first waveguide and potentially interfere with the signal in a second waveguide.

Consistent with a further aspect of the present disclosure, multi-mode interference (MMI) structure may be provided that has reduced reflections. Such structures will next be described with reference to FIGS. 11-15.

Figure 11:
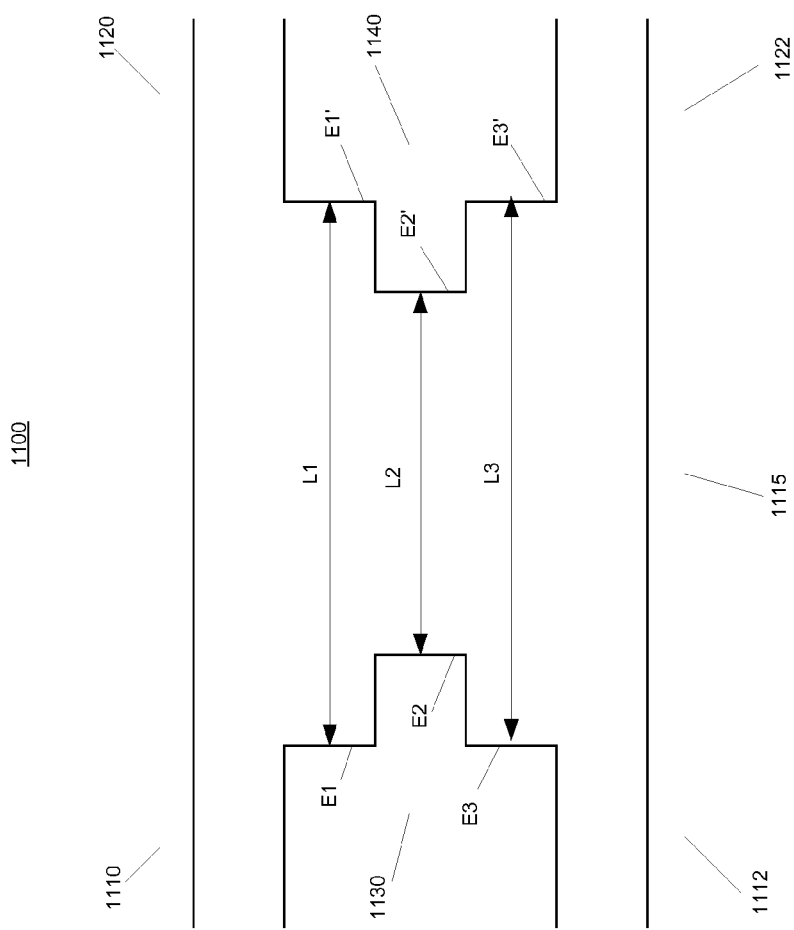
FIGS. 11-15 illustrate examples of multi-mode interference (MMI) structures consistent with further aspects of the present disclosure.

In FIG. 11, a waveguide 1100 is shown having first (1110) and second (1112) input portions, which are spaced from one another, at least one of which receives light that propagates in a direction from left to right in the drawing. Waveguide 1100 further includes MMI portion 1115, as well as first (1120) and second output (1122) portions, which are spaced from one another. As further shown in FIG. 11, the first (1110) and second (1112) input portions extend in a first direction away from first side region 1130 of the MMI portion (1115). In addition, the first (1120) and second (1122) output portions extend away from a second side region (1140) of the MMI portion 1115) in a second direction opposite the first direction. Side region 1130 has edges E1 to E3 between input portions 1110 and 1112, and side region 1140 has edges E1' to E3' between output portions 1120 and 1122. L2 is typically less than L1 and L3.

In addition, MMI portion 1115 has a first length L1 defined by first edge E1 of first side region 1130 and first edge E1' of second side region 1140. MMI portion 1115 has a second length L2 defined by second edge E2 of first side region 1130 and edge E2' of second side region 1140. Further, MMI portion 1115 has third length L3 defined by third edge E3 of first side region 1130 and third edge E3' of second side region 1140. Lengths L1, L2, and L3 are in a direction of propagation of light from input portions 1110, 1112 to output portions 1120, 1122. Length L3 is typically less than lengths L1 and L2, which may be equal to one another.

Figure 12:
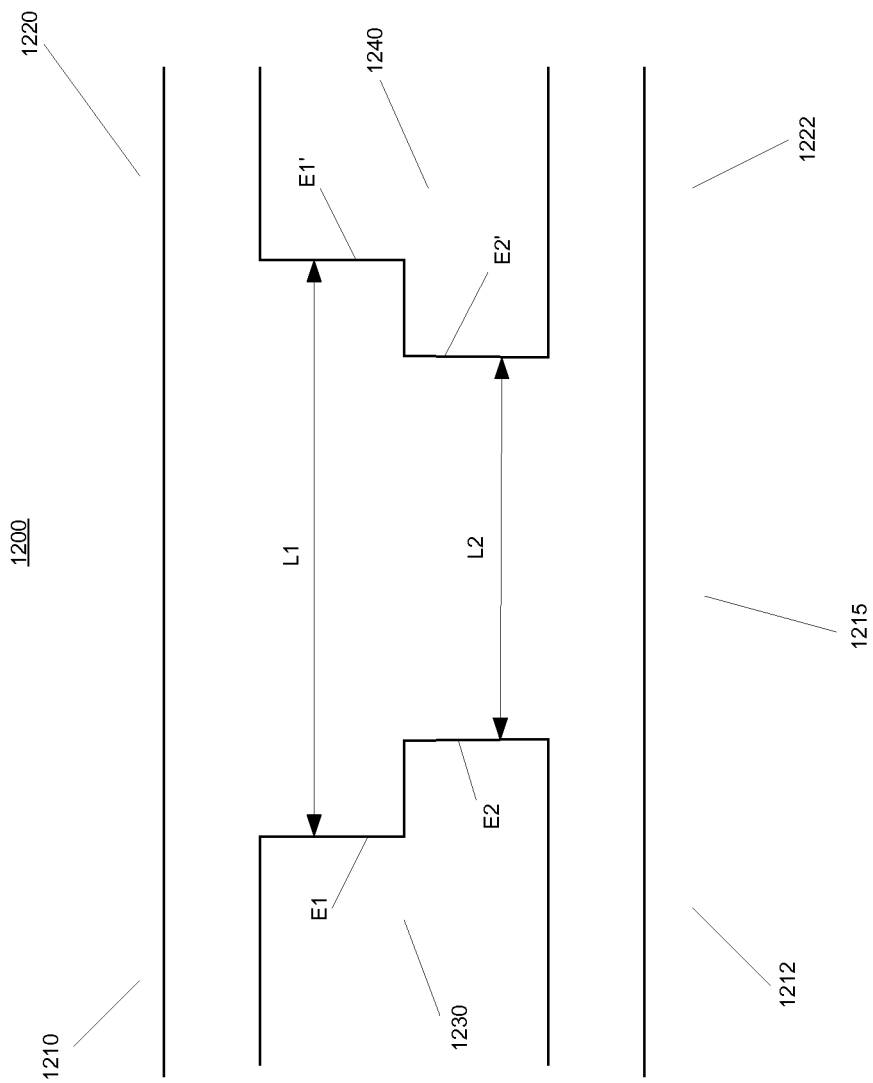

An alternative waveguide 1200 is shown in FIG. 12. Waveguide 1200 has input portions 1210, 1212 corresponding to input portions 1110 and 1112, as well as output portions 1220, 1222 corresponding to output portions 1120 and 122 of waveguide 1100 discussed above. In addition, waveguide 1200 MMI portion 1215 and opposing side regions 1230 and 1240. Side region 1230 has edges E1 and E2 provided between input portions 1210 and 1212, and side region 1240 has edges E1' and E2' provided between output portions 1220 and 1222. In FIG. 12, first length L1 is defined by edges E1 and E1, and second length L2 is defined by edges E2 and E2'. Typically, lengths L1 and L2 are different from one another in this example.

Figure 13:
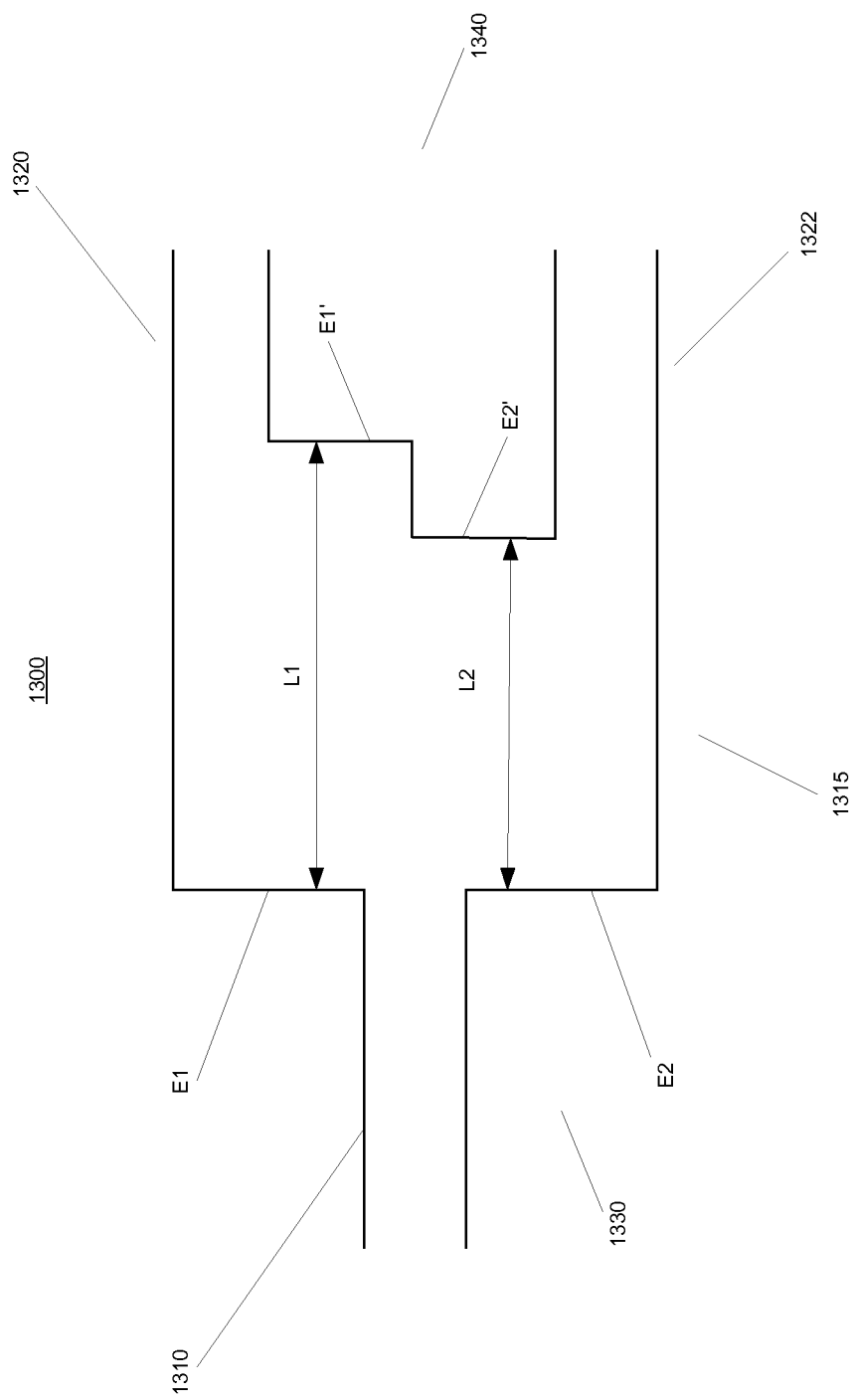

Both waveguides 1100 and 1200 may constitute 2×2 MMI couplers that receive optical signals at the input portions thereof. For example, input portions 1110 and 1112 may receive optical signals having wavelengths $\lambda 1$ and $\lambda 2$, respectively. As is generally understood, light input on portion 1100 may be supplied to either one of or both output portions 1120 or 1122 depending on the temperature or geometric parameters, i.e., the dimensions of the MMI region 1115. Similarly, depending on such parameters, light input on portion 1112 may similarly be supplied to one or both of output portions 1120 to 1122. Regardless of the desired configuration of MMI regions 1115, however, in the absence of edges E1, E2, E3 and E1', E2', and E3', light may be reflected in portions of waveguide 1100 between output portions 1220, 1222 and MMI portion 1215, i.e., portions where the effective refractive index may chance. Such reflections may interfere with the input light causing errors in transmission. Consistent with the present disclosure, however, by providing edges E1-E3 and E1'-E3' such reflections are reduced. Edges E1, E2, E1' and E2' in FIG. 12 also result in reduced reflections. A further exemplary waveguide 1300, configured as a 1×2 MMI coupler, is shown in FIG. 13. Waveguide 1300 may include an MMI portion having side regions 1330 and 1340, with an input portion for receiving one or more optical signals extending from side region 1330 in a first direction and output portions 1320 and 1322 extending from side region 1340 in a second direction opposite the first direction. Side region 1330 has edges E1 and E2, with input portion 1310 provided there between, and edges E1' and E2' of side region 1340 are provided between output portion 1320 and output portion 1322.

MMI portion 1315 may have two lengths L1 and L2 in a direction of light propagation from input portion 1310 to one or both of output portions 1320 and 1322. Length L1 is defined by edges E1 and E1' and length L2 is defined by edges E2 and E2'. Lengths L1 and L2 are typically different from one another. Waveguide structure 1300 also has fewer reflections than would otherwise occur in the absence of edges E1, E2, E1' and E2'.

Figure 14:
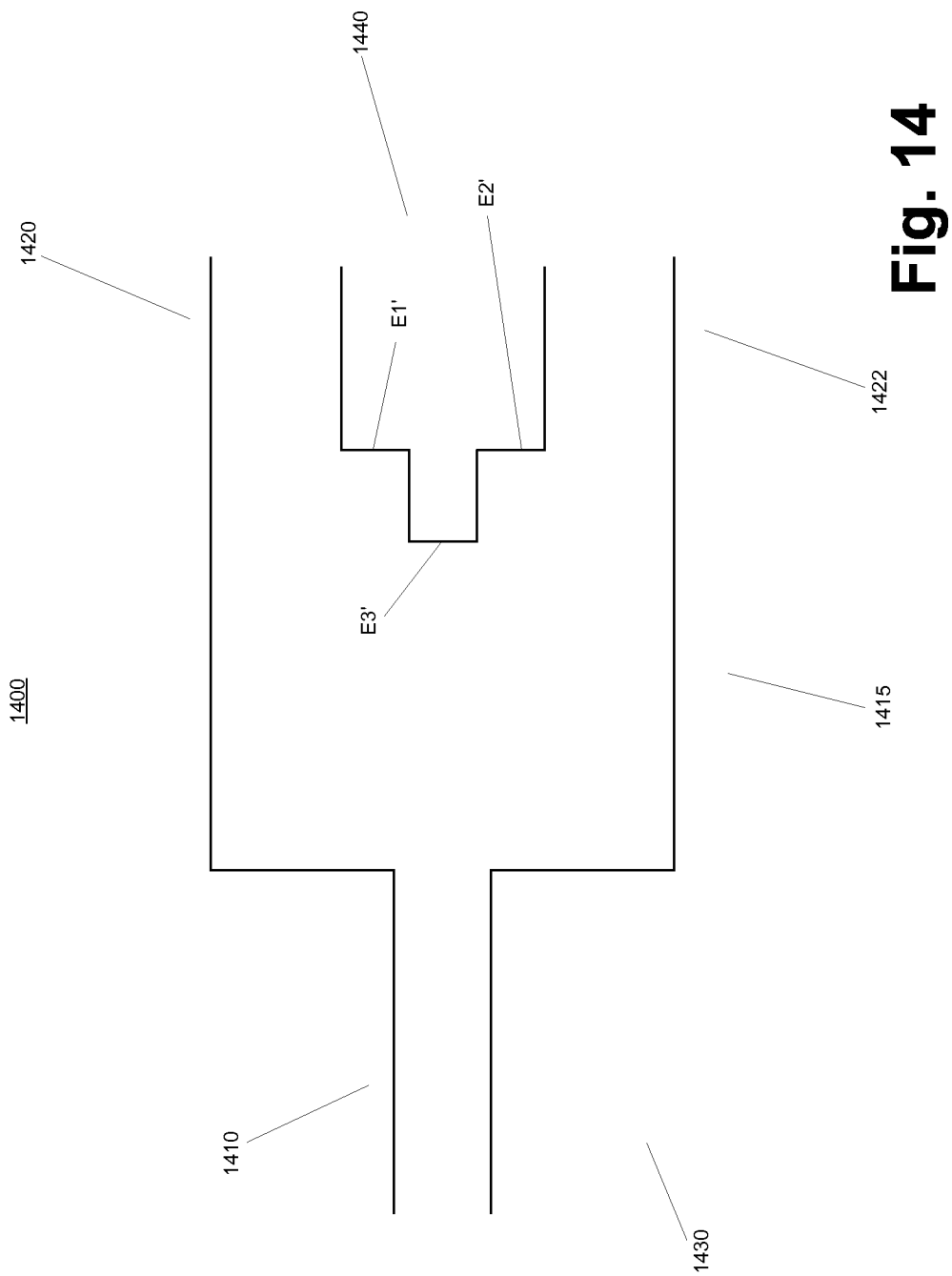

FIG. 14 shows another example of a 1×2 MMI coupler configuration. Here, waveguide 1400 has an input portion 1410, which extends from side region 1430, and output portions 1420 and 1422, which extend from side region 1440. As in waveguide 1300, light propagates in a direction from input portion 1410 to one or both of output portions 1420 and 1422. In the example shown in FIG. 14, side region 1440 has edges E1', E2', and E3', with edge E3' being recessed relative to edges E1' and E2'. MMI region 1415 also has reduced reflections.

Figure 15:
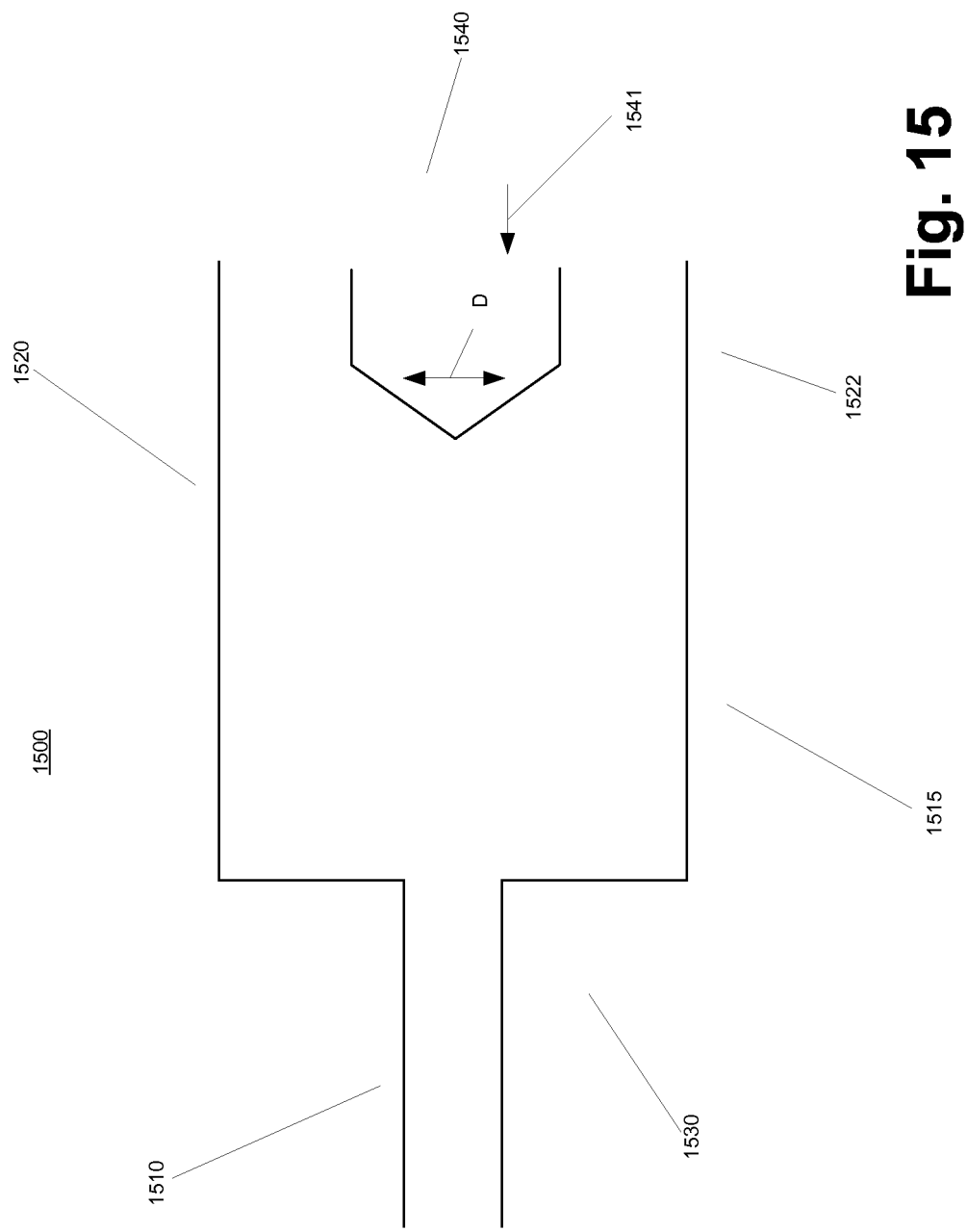

In another example shown in FIG. 15, an additional example of a low reflection MMI configuration is shown. Here, the configuration includes a waveguide 1500 that may function as a 1×2 coupler. Waveguide 1500 has an input portion 1510 that receives optical signals and output portions 1520 and 1522, one or both of which may output such optical signals. Waveguide 1500 also has an MMI portion 1515 with side regions 1530 and 1540. Input portion 1510 extends from side region 1530 in a first direction, and output portions 1520 and 1522 extend from side region 1540 in a second direction opposite the first direction. As further shown in FIG. 15, a distance D between output portions 1520 and 1522 narrows in a third direction represented by arrow 1541 toward MMI portion 1515. The direction may be the same or a different direction than the direction in which input portion 1510 extends from side region 1530. MMI portion 1515 also has reduced reflections.

A further example of a low reflection 2×2 MMI coupler will next be described with reference to FIG. 16, which shows waveguide 1600 having first (1610) and second (1612) input portions (for receiving light), an MMI portion 1615, and first (1620) and second (1622) output portions (one or both of which may output light). The first (1610) and second (1612) input portions extend from first side region 1630 of MMI portion 1615 in a first direction (as indicated by arrow 1601) away from first side region 1630 of MMI portion 1615. A distance D' between the first (1610) and second (1612) input portions adjacent MMI portion 1615 narrows in a second direction (as indicated by arrow 1603) toward first side region 1630 of MMI portion 1615.

In addition, the first (1620) and second (1622) output portions extend away from second side region 1640 of MMI portion 1615 in a third direction (as indicated by arrow 1602) away from second side region 1640. Distance D between the first (1620) and second (1622) output portions adjacent MMI portion 1615 narrow in a fourth direction (as indicated by arrow 1604) toward second side region 1640 of MMI portion 1615. That is, both the input and output portions taper toward the MMI portion.

Figure 16:
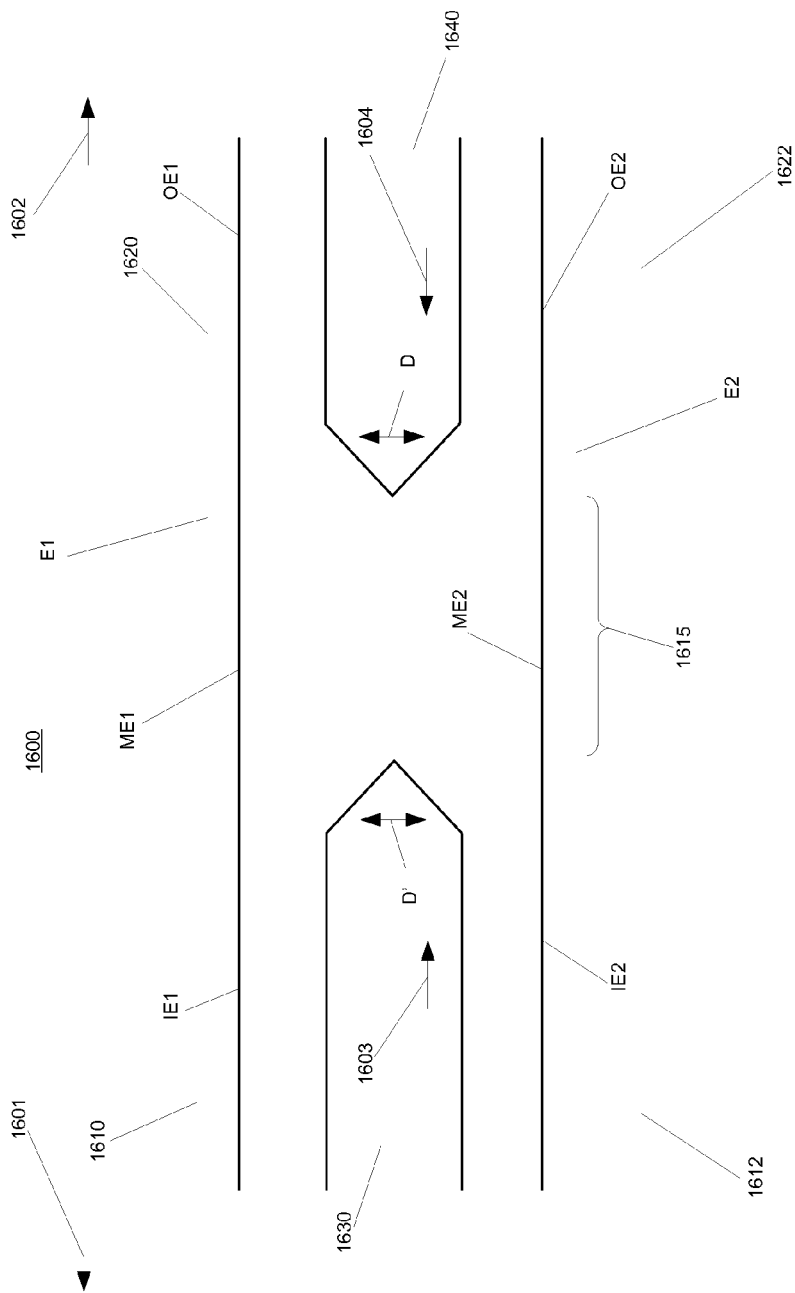
FIG. 16 shows an example of a low reflection 2×2 MMI coupler.

As further shown in FIG. 16, edges IE1, ME1, and OE1, of first input portion 1610, MMI portion 1615, and first output portion 1620, respectively, constitute a first uniform or straight edge (E1) of waveguide 1600. In addition, edges IE2, ME2, and OE2, of second input portion 1612, MMI portion 1615, and second output portion 1622, respectively, constitute a second uniform or straight edge (E2) of waveguide 1600.

2×2 MMI couplers having the configuration shown in FIG. 16 have been observed to have a reflectivity of −42 dB, which constitutes reflection suppression of −15 dB relative to a 2×2 MMI coupler without the tapering discussed above.

The foregoing description provides illustration and description, but is not intended to be exhaustive or to limit the embodiments to the precise form disclosed. For example, while the absorptive and scattering structures were described herein as being used in the TxPICs and the RxPICs, the absorptive and/or scattering structures can be used in other optical devices, such as discrete component optical transmitters, receivers, or other optical devices that can have issues with unwanted light. Modifications and variations are possible in light of the above disclosure or may be acquired from practice of the embodiments.

Even though particular combinations of features are recited in the claims and/or disclosed in the specification, these combinations are not intended to limit the disclosure of the possible embodiments. In fact, many of these features may be combined in ways not specifically recited in the claims and/or disclosed in the specification. For example, the absorptive structure may include deep levels, such as degenerately doped semiconductor material, e.g., semiconductor material having an n or p-type impurity concentration of at least $10^{20}/cm^3$. Alternatively, the absorptive structure may include one or more semi-metals, such as arsenic, carbon, tin, bismuth, mercury telluride or other materials having comparable absorption coefficients.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A photonic integrated circuit comprising:
   a substrate;
   a coupler provided on the substrate, the coupler having an input port and first and second output ports, the input port receiving an optical signal, the first output port supplying a first portion of the optical signal and the second output port supplying a second portion of the optical signal;
   an output waveguide circuit that receives the first portion of the optical signal; and
   an integrated structure provided on the substrate at the second output port that scatters part of the second portion of the optical signal without an electrical bias applied to the structure or without routing of the second portion of the optical signal off the substrate.

2. A photonic integrated circuit in accordance with claim 1, wherein the coupler is a multi-mode interference (MMI) coupler and the second output port is a dump port of the MMI coupler.

3. A photonic integrated circuit in accordance with claim 1, wherein the coupler is a first coupler, the photonic integrated circuit further including a Mach-Zehnder interferometer (MZI), the MZI including first and second waveguides extending between the first coupler and second coupler, the second output port being a dump port of the second coupler.

4. A photonic integrated circuit in accordance with claim 1, where the structure includes a spiral-shaped waveguide that receives the second portion of the optical signal.

5. A photonic integrated circuit in accordance with claim 1, further including a waveguide having a width in a first direction that is transverse to a second direction, the optical signal propagating in the waveguide in the second direction, the structure has a first end portion that receives the second portion of the optical signal and a second end portion, the first end portion having a first width and the second end portion having a second width, the first and second widths extending in the first direction, such that a transition from a width of the waveguide to the first width of the first end portion is non-adiabatic and abrupt, and the second portion of the optical signal propagates in the second direction from the first end portion of the structure to the second end portion of the structure, the first width being greater than the second width.

6. A photonic integrated circuit in accordance with claim 5, wherein the structure is a multi-mode interference coupler.

7. A photonic integrated circuit in accordance with claim 1, wherein the structure includes a waveguide, the waveguide having a roughened surface with features sizes greater than 0.5 microns.

8. A photonic integrated circuit in accordance with claim 1, the photonic integrated circuit further including a device that absorbs a portion of the scattered light.

9. A photonic integrated circuit in accordance with claim 8, wherein the device includes a cladding layer provided on the substrate, a core layer provided on the cladding layer, and a metal layer provided on the core layer.

10. A photonic integrated circuit in accordance with claim 9, wherein the metal layer include a refractory metal.

11. A photonic integrated circuit in accordance with claim 8, wherein the device includes a first cladding layer provided on the substrate, a core layer provided on the first cladding layer, a second cladding layer provided on the core layer, and a metal layer provided on the second cladding layer.

12. A photonic integrated circuit in accordance with claim 11, wherein the metal layer include a refractory metal.

* * * * *